S. STUART.
Shaft-Couplings.

No. 155,121. Patented Sept. 15, 1874.

UNITED STATES PATENT OFFICE.

SINCLAIR STUART, OF NEW YORK, N. Y.

IMPROVEMENT IN SHAFT-COUPLINGS.

Specification forming part of Letters Patent No. 155,121, dated September 15, 1874; application filed August 27, 1874.

*To all whom it may concern:*

Be it known that I, SINCLAIR STUART, of New York, in the county and State of New York, have invented an Improved Shaft-Coupling, of which the following is a specification:

My invention relates to a coupling which is particularly intended for the repairing of broken shafts, and more especially the shafts of screw-propellers when broken at sea, although it may be applied with equal readiness to the repairing of shafts in general.

The invention consists in the combination of a series of shouldered grooves in the shaft with a clamp provided with a series of interrupted tongues or ribs corresponding with said shouldered grooves, whereby the broken parts are securely held together, and not only caused to rotate together, but prevented from displacement by longitudinal strain on the shaft. The invention consists, further, in the combination, with the said clamps, tongues, and grooves, of an enlarged cavity in the clamp, whereby provision is made for the reception of any bent or enlarged portion of the shaft at the broken ends.

Figure 1:
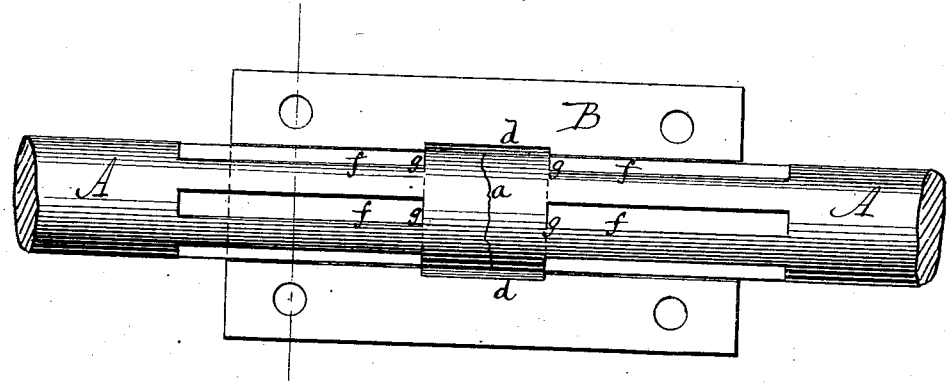
Figure 2:
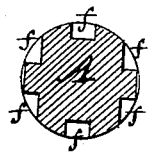
Figure 3:
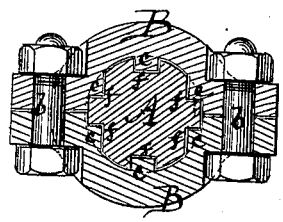
Figure 4:
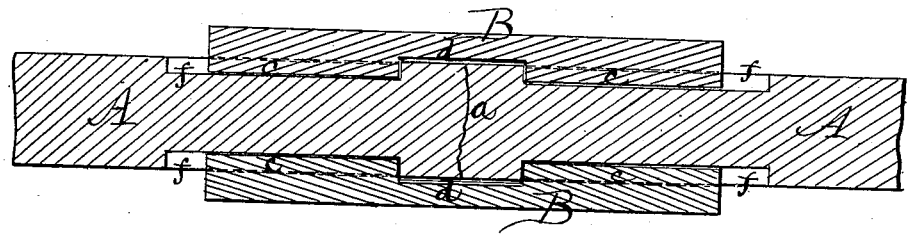

In the accompanying drawing, Figure 1 is a top or side view with one-half of the clamp removed. Fig. 2 is a transverse section of the shaft. Fig. 3 is a transverse section through the shaft and coupling. Fig. 4 is a central longitudinal section of the shaft and coupling.

A represents a shaft, which has been broken, as indicated by the line $a$. B is the clamp or coupling, which consists of two halves, secured together by bolts $b$. Said clamp may be of cylindrical or approximate form, with flanges to facilitate the securing of the halves together. On the inner surface of the clamp is a series of longitudinal tongues or ribs, $c$, which are interrupted about midway of their length by a cylindrical enlargement, $d$, slightly larger than the shaft A. The tongues or ribs may be of any suitable shape, either angular or rounded, and there may be any desired or convenient number thereof.

When a shaft becomes broken, as indicated by the line $a$, the two broken ends are placed together, and a number of grooves, $f$, are formed on the surface of the shaft, corresponding in form, number, and position with the tongues or ribs $c$ on the clamp. The grooves $f$ are interrupted by shoulders $g$, forming the inner terminations of said grooves at points corresponding in position with the enlarged cavity $d$ in the clamp. The clamp or coupling B is then placed in position surrounding the shaft, so that the tongues $c$ will engage with the grooves $f$, and the interrupted portions of the tongues will fit closely against the shoulders $g$, and the clamp is then fastened by the bolts $b$. By this means the two parts of the shaft are securely held together, and by the engagement of the interrupted tongues and shouldered grooves the displacement of the parts, in consequence of backward or outward strain, is prevented. Any twist or bend or other irregularity which may exist at the broken ends of the shaft is received by the enlarged cavity $d$.

What I claim as new, and desire to secure by Letters Patent, is—

1. The sections of the coupling or clamp B, each formed with a series of shoulders, $c$, in combination with a shaft, A, having a series of corresponding depressions or grooves, substantially as herein shown and described.

2. The sections of the coupling B, constructed with shoulders $c\ c$ at the point of union between its two halves, and with a cavity, $d$, in combination with a shaft, A, having shoulders $g\ g$ and shouldered grooves $f\ f$, forming lateral projections on the shaft, substantially as described, so that the sections, when brought together, clamp such projections between them, as set forth.

SINCLAIR STUART.

Witnesses:
HENRY T. BROWN,
MICHAEL RYAN.